(12) United States Patent
Zou et al.

(10) Patent No.: US 10,671,835 B2
(45) Date of Patent: Jun. 2, 2020

(54) OBJECT RECOGNITION

(71) Applicant: Hong Kong Applied Science and Technology Research Institute Co., Ltd., Shatin, New Territories (HK)

(72) Inventors: Cheng Zou, Mountain Shore (HK); Shi Le Ou, Ma On Shan (HK); Wing To Ku, Tai Po (TW)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 54 days.

(21) Appl. No.: 15/912,290

(22) Filed: Mar. 5, 2018

(65) Prior Publication Data

US 2019/0272411 A1   Sep. 5, 2019

(51) Int. Cl.
*G06K 9/00*    (2006.01)
*G06T 7/10*    (2017.01)
*G06T 7/70*    (2017.01)

(52) U.S. Cl.
CPC ..... *G06K 9/00208* (2013.01); *G06K 9/00214* (2013.01); *G06T 7/10* (2017.01); *G06T 7/70* (2017.01); *G06T 2207/10028* (2013.01)

(58) Field of Classification Search
CPC .......... G06K 9/00208; G06K 9/00214; G06K 9/6211; G06K 9/00355; G06K 9/00389; G06K 9/00369; G06T 7/10; G06T 7/70; G06T 2207/10028; G06T 2207/10072; G06T 2207/30048; H04N 19/597; H04N 19/147; E05Y 2400/86; G06Q 30/0601
See application file for complete search history.

(56) References Cited

U.S. PATENT DOCUMENTS

| 8,199,977 | B2 | 6/2012 | Krishnaswamy et al. |
| 8,274,506 | B1 | 9/2012 | Rees |
| 2005/0271279 | A1* | 12/2005 | Fujimura ........... G06K 9/00355 382/203 |
| 2007/0262988 | A1 | 11/2007 | Christensen |

(Continued)

FOREIGN PATENT DOCUMENTS

WO    WO-2017/220966 A1    12/2017

OTHER PUBLICATIONS

NPL search report, Google (Year: 2018).*

(Continued)

*Primary Examiner* — Jianxun Yang
(74) *Attorney, Agent, or Firm* — Norton Rose Fulbright US LLP

(57) ABSTRACT

The present disclosure relates to methods, devices, and systems for object recognition. For example, the systems, devices, and methods described herein may be used to recognize types, orientations and positions of objects, such as objects (e.g., planar industrial parts) in a bin picking industrial environment. In an aspect of the present disclosure, a system for object recognition may project first 3D point cloud surface data to a 2D representation data. The system may perform a matching operation to evaluate a 2D object pose of the 2D representation data and to match the 2D representation data to a 2D object template. After a match is identified, the system may project the 2D representation data to 3D space to obtain a coarse 3D object pose.

27 Claims, 12 Drawing Sheets

(56) References Cited

U.S. PATENT DOCUMENTS

| | | | | |
|---|---|---|---|---|
| 2008/0292169 | A1* | 11/2008 | Wang | G06T 7/0012 |
| | | | | 382/131 |
| 2010/0111370 | A1* | 5/2010 | Black | G06K 9/00369 |
| | | | | 382/111 |
| 2010/0166294 | A1* | 7/2010 | Marrion | G06K 9/00214 |
| | | | | 382/154 |
| 2011/0157178 | A1 | 6/2011 | Tuzel et al. | |
| 2013/0250042 | A1* | 9/2013 | Raghoebardayal | A63F 13/06 |
| | | | | 348/36 |
| 2014/0204088 | A1* | 7/2014 | Kirk | H04N 19/597 |
| | | | | 345/427 |
| 2017/0308736 | A1 | 10/2017 | Sharma et al. | |

OTHER PUBLICATIONS

Drost, B. et al. "Model Globally, Match Locally: Efficient and Robust 3D Object Recognition," IEEE Computer Society Conference on Computer Vision and Pattern Recognition, 2010, 8 pages.
International Search Report and Written Opinion issued for PCT Application No. PCT/CN2018/078615, dated Dec. 5, 2018; 9 pages.

* cited by examiner

OBJECT RECOGNITION

TECHNICAL FIELD

The present disclosure is generally related to object recognition, and more particularly to improvements for planar object recognition based on 3D point cloud data.

BACKGROUND

Computer vision is used to enable machines, such as computers, to process a scene of a field of view. Based on the processed scene, a machine can initiate one or more actions or operations. Computer vision systems can operate on two-dimensional (2D) data or on three-dimensional (3D) data.

One industry in which computer vision is used is the manufacturing industry. To illustrate, the manufacturing industry uses 2D computer vision image processing for many tasks, such as defect inspection and object recognition. For sophisticated and/or complex tasks, such as bin picking (e.g., navigating a robot to select a target object from a bin of random placed and stacked objects, 2D computer vision image processing is generally insufficient to generate efficient and effective recognition and selection of desired target objects. To illustrate, in a bin picking situation where a one or more object type are stacked randomly, in different orientations, one on top of each other, 2D computer vision image processing is computationally time consuming, has difficulty recognizing objects in various orientations and various positions, as illustrative, non-limiting examples. For such sophisticated and complex tasks, attempts to implement computer vision have extended into the 3D space.

However, use of 3D computer vision processing in sophisticated and complex environments and applications, such as bin picking in the manufacturing industry, poses several difficulties and challenges to accurately and efficiently classify a 3D object and evaluate the 3D orientation, position of the objects using 3D computer vision processing. For example, industrial components or parts are totally random in orientation and position, which makes conventional multi-view methods (e.g., methods using image data of a scene from two or more image capture devices) complex and inaccurate. As another example, features of some objects are similar in a multi-model scene for industrial parts, which makes texture based 2D recognition methods incorporated into 3D computer vision processing less feasible. As a further example, incomplete features extraction of 3D data due to occlusion and excessive light reflection reduce reliability of acquired 3D and thus reduce effectiveness of 3D computer vision processing to accurately recognize objects. As yet another example, 3D computer vision processing in bin picking has proven difficult to achieve efficiency with good accuracy for industrial applications.

One conventional approach of 3D computer vision processing uses depth image data that is generated based on 2D color features of an red-green-blue (RGB) image. This depth image data approach relies on color and texture of objects in to perform multi-view detection of an object. In industrial bin picking applications where objects (e.g., parts) often lack color and/or texture, the depth image data lacks accuracy in identification and recognition of objects because the multi-view processing used to evaluate the orientation of an object is complex during a template generating phase, has quantization errors, and cannot accurately process and identify textureless objects.

Another conventional approach of 3D computer vision processing uses point cloud processing in which 3D features are extracted from 3D edges and surfaces of the objects to perform template matching. However, the conventional point cloud processing can be time consuming as data in all 3D dimensions are extracted and processed. Additionally, the conventional point cloud processing cannot adequately handle object recognition if objections do not have shape features (e.g., rich edges and/or curvatures), such as relatively planar parts that do not have sharp 3D features, resulting in unreliable 3D feature extraction may be occurred during the recognition process. Therefore, traditional point cloud based methods are slow and cannot adapt to planar part as planar parts do not have rich 3D features.

In light of the above, a method for planar object recognition based on 3D point cloud approach for random bin picking application is proposed in this invention. Specifically, this invention teaches a method with features of converting 3D objects to 2D objects for detection and further use an enhanced 3D object for recognition process in order to enhance efficiency and accuracy of planar object recognition.

SUMMARY

The present disclosure is generally related to systems, devices, and methods that perform object recognition. For example, the systems, devices, and methods described herein may be used to recognize types, orientations and positions of objects, such as objects (e.g., planar industrial parts) in a bin picking industrial environment. In an aspect of the present disclosure, a system for object recognition projects first 3D point cloud surface data (e.g., 3D point cloud plane data) to a 2D representation data using a 3D surface center and normal. In some implementations, the 3D point cloud surface data may be a portion of 3D point cloud data that was previously segmented form the 3D point cloud data by performing a first segmentation operation, such as a planar segmentation operation. The system performs a matching operation to evaluate a 2D object pose of the 2D representation data and to match the 2D representation data to a 2D object template. After a match is identified, the system projects the 2D representation data to 3D space to obtain a coarse 3D object pose. In some implementations, the system then segments the 3D point cloud surface data based on the first 3D object pose to generate second 3D point cloud surface data (e.g., a subset of the first 3D point cloud surface data). Additionally, the system may perform an iterative closest point (ICP) operation to fine tune the 3D pose.

The present disclosure advantageously performs 3D object recognition in a manner that can be applied in manufacturing and robotic industry applications. For example, the present disclosure can enable a machine to detect planar object, classify the object, and recognize its 3D position and orientation for random bin picking. Additionally, the present disclosure may advantageously perform the 3D object recognition without 2D color/texture information and without performing unreliable 3D feature extraction operations. The systems, devices, and methods of the present disclosure enhance the overall efficiency and accuracy of object recognition, such as object recognition for planar parts object. For example, in industrial bin picking applications, the systems, devices, and methods of the present disclosure may achieve efficiency (e.g., speed) of less than 1-2 seconds for up to 5 million data points with accuracy of greater than or equal to 95%. Additionally, the present disclosure segments point cloud data for future processing which reduces an amount of points of the point cloud for further processing, resulting in faster and more efficient object recognition. This segmentation (e.g., pre-processing of received point cloud data) does not reduce the density of point cloud data for a segmented portion of data; rather it removes noise points cloud pieces and identifies a sub point clouds that is likely to include a detectable/recognizable object. Performing dual direction ICP may compensate for occluded point cloud data by aligning occluded input point cloud data to a template point cloud of a coarse initial pose guess, thus producing a fine-tuned pose that compensates for one or more occluded point cloud data points. By performing 2D matching rather than a 3D matching operation, objection recognition may be performed faster and more efficiently than conventional techniques which perform 3D feature extraction and matching, and may accurately recognize planar part and/or parts that have a relatively planar surface.

In an aspect of the present disclosure, a method for objection recognition includes receiving point cloud data and segmenting the point cloud data to identify planes in a field of view (FOV). For example, segmenting the point cloud data may include a planar segmentation operation that does not rely on 3D color or texture information and that generates one or more sets of planar point cloud data. For each segmented point cloud, the method includes projecting the segmented point cloud data to a corresponding 2D image for a 2D matching operation. To illustrate, to project the segmented point cloud data from 3D to 2D, the method may determine a center and a normal vector. The method further includes performing a matching operation to identify a 2D template (corresponding to an object type) that matches the 2D representation of the segmented point cloud data. For example, the method may use 2D chamfer matching, as an illustrative, non-limiting example. As another example, a matching operations other than 2D chamfer matching may be used. The other matching operation may produce a 2D location and rotation output. After a match result, the method performs a 2D Pose to 3D projection to generate a 3D pose of the object and performs a segmentation operation on the previously segmented point cloud data based on the 3D pose to remove the matched object from the segmented point cloud as second segmented point cloud data. Because the previously segmented point cloud data may have contained to objects, this segmentation operation isolates a portion of the previously segmented point cloud data corresponding to the matched object. The method also includes performing ICP operations to fine tune the second segmented point cloud prior to providing an out.

Thus, the present discloser describes systems, devices, and methods that perform object recognition to detect an object (e.g., an object having planar surface) and recognize its 3D position and orientation for random bin pick in a manufacturing and robotic industry application. The systems, devices, and methods do not rely on 2D texture, avoid unreliable 3D feature extraction, and enhance the overall efficiency and accuracy of object recognition. For example, the overall efficiency and accuracy may be improved for objects having planar surfaces or features. Additionally, the systems, devices, and methods advantageously shorten computation time by performing plane segmentation (e.g., planar segmentation), reduce time and accuracy by combining performing 2D matching, and improve accuracy on incomplete object point clouds by performing dual direction ICP.

The foregoing has outlined rather broadly the features and technical advantages of the present disclosure in order that the detailed description that follows may be better understood. Additional features and advantages will be described hereinafter which form the subject of the claims. It should be appreciated by those skilled in the art that the conception and specific examples disclosed may be readily utilized as a basis for modifying or designing other structures for carrying out the same purposes described herein. It should also be realized by those skilled in the art that such equivalent constructions do not depart from the spirit and scope of the disclosure as set forth in the appended claims. The aspects which are characterized herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWING

For a more complete understanding of the present disclosure, reference is now made to the following descriptions taken in conjunction with the accompanying drawing, in which.

DETAILED DESCRIPTION

Particular implementations of the present disclosure are described below with reference to the drawings. In the description, common features are designated by common reference numbers throughout the drawings. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term).

As used herein, various terminology is for the purpose of describing particular implementations only and is not intended to be limiting of implementations. For example, the singular forms "a," "an," and "the" are intended to include the plural forms as well, unless the context clearly indicates otherwise. It may be further understood that the terms "comprises" and "comprising" may be used interchangeably with "includes" or "including." Additionally, it will be understood that the term "wherein" may be used interchangeably with "where."

Figure 1:
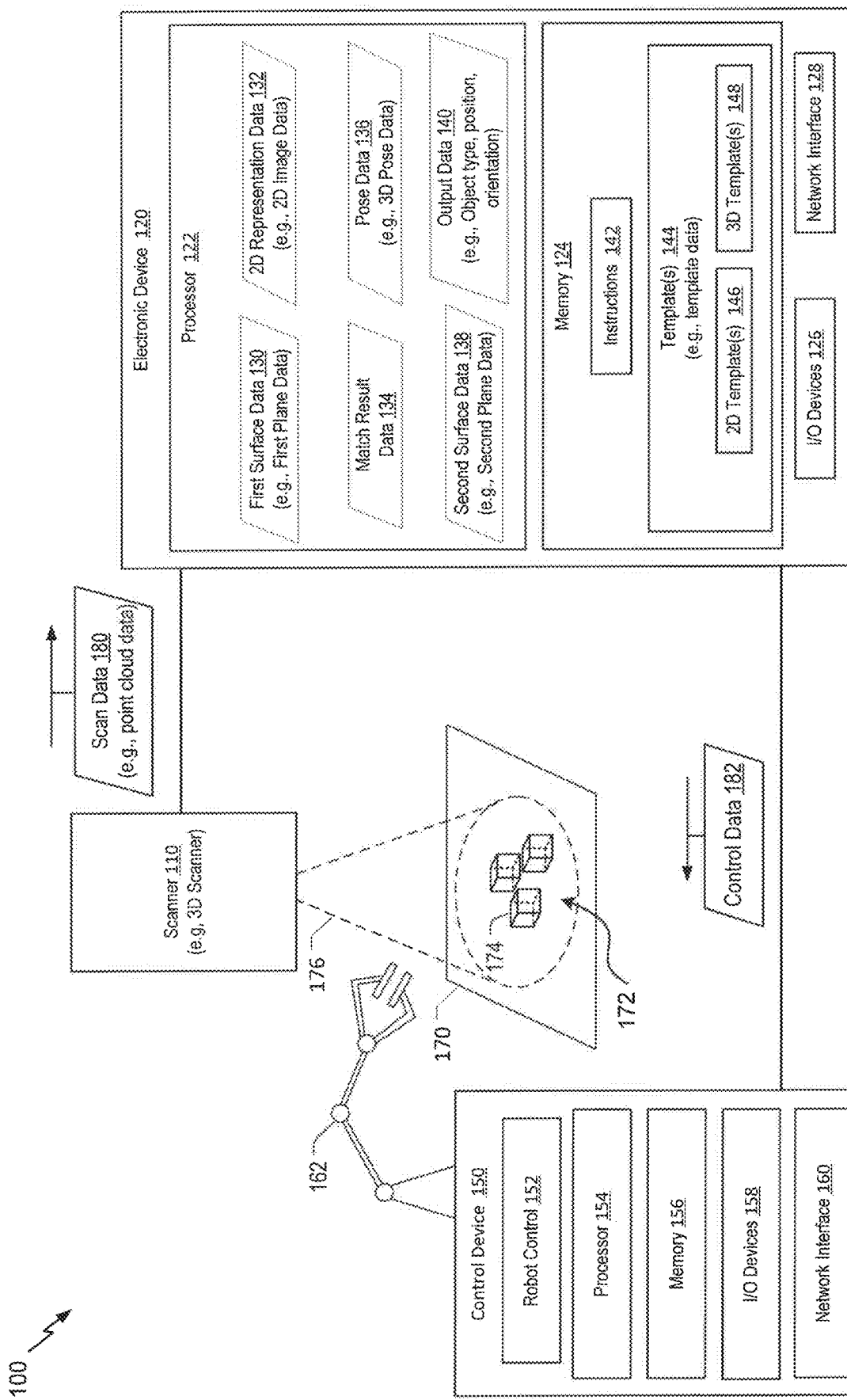
FIG. 1 illustrates an exemplary system in which the exemplary embodiments of the instant invention may be practiced.

Referring to FIG. 1, a block diagram of an example of a system 100 for object recognition is depicted. For example, the system 100 may be used to recognize types, orientations and positions of objects, such as objects (e.g., planar industrial parts) in a bin picking industrial environment.

The system 100 includes a scanner 110, an electronic device 120, a control device 150, and a workspace 170. The electronic device 120 is communicatively coupled to scanner 110 and to control device 150. Scanner 110, such as a 3D scanner is positioned to have a field of view 176 of workspace 170. Workspace 170 (e.g., bin) includes multiple objects 172, such as a representative object 174. Scanner 110 is configured to generate scan data 180, such as point cloud data, of the one or more objects 174.

The electronic device 120 may include a smartphone, a tablet computing device, a personal computing device, a laptop computing device, a desktop computing device, a computer system, a server, etc. Although described as being separate from scanner 110, in other implementations, electronic device 120 may be incorporated in the same device as scanner 110.

Electronic device 120 includes processor 122, memory 124, one or more I/O devices 126, and network interface 128. Processor 122 may comprise various forms of processor-based systems in accordance with aspects described herein. For example, processor 122 may include a general purpose computer system (e.g., a personal computer (PC), a server, a tablet device, etc.) and/or a special purpose processor platform (e.g., application specific integrated circuit (ASIC), system on a chip (SoC), etc.). In some implementations, processor 122 includes one or more processors, such as an image processor. Processor 122 may be configured to process scan data 180 and to perform object detection and/or recognition. Additionally, or alternatively, processor 122 may be configured to generate control information, such as control data 182, for control device 150. For example, processor 122 may be configured to perform one or more operations as described herein. To process scan data 180, processor 122 may generate data, such as first surface data 130, 2D representation data 132, match result data 134, pose data 136, second surface data 138, output data 140, or a combination thereof.

Memory 124 may include ROM devices, RAM devices, one or more HDDs, flash memory devices, SSDs, other devices configured to store data in a persistent or non-persistent state, or a combination of different memory devices. The memory 124 includes instructions 142 and one or more templates 144 (e.g., template data). In aspects, memory 124 may store the instructions 142 that, when executed by processor 122, cause the processor 122 to perform operations according to aspects of the present disclosure, as described herein. The one or more templates 144 include one or more 2D templates 16 and one or more 3D templates. In some implementations, memory 124 may include one or more 3D templates 148 and processor 122 may be configured to generate the one or more 2D templates 146 from the one or more 3D templates.

The one or more I/O devices 126 may include a mouse, a keyboard, a display device, the camera, other I/O devices, or a combination thereof. The network interface 128 may be configured to communicatively couple the electronic device 120 to one or more external devices, such as scanner 110, control device 150, or both, via one or more networks. For example, electronic device 120 may be configured to receive scan data 180 from scanner 110, detect/recognize and object based on scan data 180, and output control data 182 to control device 150.

In an aspect, the electronic device 120 may be a single device configured to perform the operations described herein. Those of skill in the art would recognize that although FIG. 1 illustrates the electronic device 120 as a single block, the implementation of electronic device 120 is not limited to a single component, and instead may be distributed over several components. For example, operations of the electronic device 120 may be distributed over multiple devices configured to perform all or a portion of the operations of the electronic device 120 in accordance with the present disclosure. Implementing the electronic device 120 functionality over multiple devices may increase efficiency, processing time, and reliability of system 100.

The control device 150 includes robot control 152, one or more processors 154, a memory 156, one or more input/output (I/O) devices 158, and a network interface 160. Although described as being separate from scanner 110 and electronic device 120, in other implementations, control device 150 may be incorporated in the same device as scanner 110, electronic device 120, or both.

Robot control 152 may be coupled to a robot (e.g., a mechanical device), such as robotic arm 162, that is configured to select an object (e.g., 174) from the multiple objects. For example, robot control 152 may include a motor, a servo, hydraulics, etc. Although robot control 152 is described as being coupled to a robot (e.g., 162), additionally or alternatively, robot control 152 may be coupled to another device, such as a magnet.

Processor 154 may comprise various forms of processor-based systems in accordance with aspects described herein. For example, processor 154 may include a general purpose computer system (e.g., a personal computer (PC), a server, a tablet device, etc.) and/or a special purpose processor platform (e.g., application specific integrated circuit (ASIC), system on a chip (SoC), etc.). In some implementations, processor 154 includes one or more processors, such as an image processor. Processor 154 may be configured to process control data 182 and to process the control data 182 to provide one or more control signals to robot control 152.

Memory 156 may include ROM devices, RAM devices, one or more HDDs, flash memory devices, SSDs, other devices configured to store data in a persistent or non-persistent state, or a combination of different memory devices. In aspects, memory 156 may store the instructions that, when executed by processor 154, cause the processor 154 to perform operations according to aspects of the present disclosure, as described herein, such as operating robotic arm 162.

The one or more I/O devices 158 may include a mouse, a keyboard, a display device, the camera, other I/O devices, or a combination thereof. The network interface 160 may be configured to communicatively couple the control device 150 to one or more external devices, such as scanner 110, control device 150, robotic arm 162, or a combination thereof, via one or more networks. For example, control device 150 may be configured to receive control data 182 from electronic device 120 and to operate robotic arm 162 responsive to the control data 182.

During operation, scanner 110 scans workspace 170 and generates scan data 180 (e.g., 3D point cloud data). Electronic device 120 receives 3D point cloud data, such as scan data 180, from scanner 110 and segments the 3D point cloud data to generate the first 3D surface data 130. For example, electronic device 120 may segment 3D point cloud data as described herein with reference to at least FIGS. 2, 4, and 5. The first 3D surface data 130 may include a subset of the 3D point cloud data. Electronic device 120 may generate two-dimensional (2D) representation data 132 based on first three-dimensional (3D) surface data 130 associated with an object (e.g., 174). For example, electronic device 120 may segment 3D point cloud data as described herein with reference to at least FIGS. 2, 4, and 6.

Electronic device 120 (e.g., processor 122) may select a 2D object template (e.g., 146) and compare the two 2D object template and the 2D representation data 132. Electronic device 120 (e.g., processor 122) may generate match result data 134 based on a determination that the two 2D object template matches the 2D representation data. For example, electronic device 120 may perform one or more matching operations as described herein with reference to at least FIGS. 2, 4, and 7. The match result data 134 may correspond to recognition of an object (e.g., an object type) of the multiple objects 172 scanned by scanner 110. Electronic device 120 generate 3D pose data (e.g., 136) from at least a portion of the 2D representation data 132 based on match result data 134. For example, electronic device 120 may generate 3D pose data (e.g., 136) as described herein at least with reference to FIGS. 2 and 4.

Electronic device 120 segments the first 3D surface data 130 based on the 3D pose data (e.g., 136) to generate second 3D surface data 138. For example, electronic device 120 may segment first 3D surface data 130 as described herein at least with reference to FIGS. 2, 4, and 8. In some implementations, the first 3D surface data 130 and the second 3D surface data 138 are the same data. Electronic device 120 may select a 3D object template (e.g., 148) and perform a dual direction iterative closest point (ICP) operation using the second 3D surface data 138 and the 3D object template. For example, electronic device 120 may segment the dual direction ICP operation as described herein at least with reference to FIGS. 2, 4, and 9. In some implementations, the electronic device 120 (e.g., processor 122) may output a 3D pose (e.g., 140) based on the ICP operation. In a particular implementation, the 3D pose may include an object type indicator, a portion indicator, an orientation indicator, or a combination thereof. Additionally, or alternatively, electronic device 120 may generate, based on the output data 140, the control data 182 to cause the object to be identified and selected by control device 150 and/or robotic arm 162.

In a particular aspect of the system 100 of FIG. 1, an apparatus (e.g., the electronic device 120) includes memory 124 configured to store instructions 142 and include processor 122 coupled to the memory 124. The processor 122 is configured to execute the instructions 142 to cause the processor 122 to perform a three-dimensional (3D) to two-dimensional (2D) projection operation on first 3D surface data 130 associated with an object (e.g., 174) to generate 2D representation data 132 associated with the object (e.g., 174). The processor 122 is further configured to execute the instructions 142 to cause the processor 122 to generating 3D pose data (e.g., 136) from at least a portion of the 2D representation data 132 based on match result data 134. In some implementations, first 3D surface data 130 comprises planar surface data.

In some implementations, the apparatus (e.g., the electronic device 120) further includes an interface (e.g., 128) configured to receive point cloud data (e.g., 180). Additionally, or alternatively, processor 122 may be configured to execute the instructions 142 to cause the processor 122 to segment the point cloud data (e.g., 180) to generate the first 3D surface data 130. To illustrate, the first 3D surface data 130 may include a subset of the 3D point cloud data (e.g., 180). In some such implementations, the processor 122 may be further configured to execute the instructions 142 to cause the processor to perform a matching operation to generate the match result data 134.

In some implementations, the processor 122 may be configured to execute the instructions 142 to cause the processor 122 to segment the first 3D surface data 130 based on the 3D pose data (e.g., 136) to generate second 3D surface data 138. In some such implementations, processor 122 is further configured to execute the instructions 142 to cause the processor 122 to generate output data 140. The output data 140 may indicate an object type of the object (e.g., 174), a position of the object, an orientation of the object, or a combination thereof. Additionally, the processor 122 may be configured to generate, based on the output data 140, the control data 182 to cause the object to be identified and selected by control device 150 and/or robotic arm 162.

In some implementations, each of the processors 122, 154 may be configured to execute software (e.g., a program represented by one or more of the instructions 142) stored in a corresponding memory 124, 156 (e.g., a non-transitory computer readable medium). For example, the processors 122, 154 may be configured to execute instructions to perform one or more operations described herein.

One advantage provided by the system 100 of FIG. 1 is that the system 100 provides 3D object recognition in a manner that can be applied in manufacturing and robotic industry applications. For example, electronic device 120 can detect planar object, classify the object, and recognize its 3D position and orientation for random bin picking. Additionally, electronic device 120 (e.g., processor 122) may advantageously perform the 3D object recognition without 2D color/texture information and without performing unreliable 3D feature extraction operations. Accordingly, system 100 enhances the overall efficiency and accuracy of object recognition, such as object recognition for planar parts object. To illustrate, in an industrial bin picking application, system 100 may achieve efficiency (e.g., speed) of less than 1-2 seconds for up to 5 million data points with accuracy of greater than or equal to 95%. In some implementations, the accuracy may be greater than or equal to 98%. Additionally, system 100 (e.g., electronic device 120) advantageously segments point cloud data for future processing which reduces an amount of points of the point cloud for further processing, resulting in faster and more efficient object recognition. This segmentation (e.g., pre-processing of received point cloud data) does not reduce the density of point cloud data for a segmented portion of data; rather it removes noise points cloud pieces and identifies a sub point clouds that is likely to include a detectable/recognizable object. System 100 (e.g., electronic device 120) also beneficially performs dual direction ICP which may produce a fine-tuned pose that compensates for one or more occluded point cloud data points. Further, system 100 (e.g., electronic device 120) is configured to perform 2D matching, rather than a 3D matching operation, which may be performed faster and more efficiently than conventional techniques which perform 3D feature extraction and matching, and may accurately recognize planar part and/or parts that have a relatively planar surface.

Figure 2:
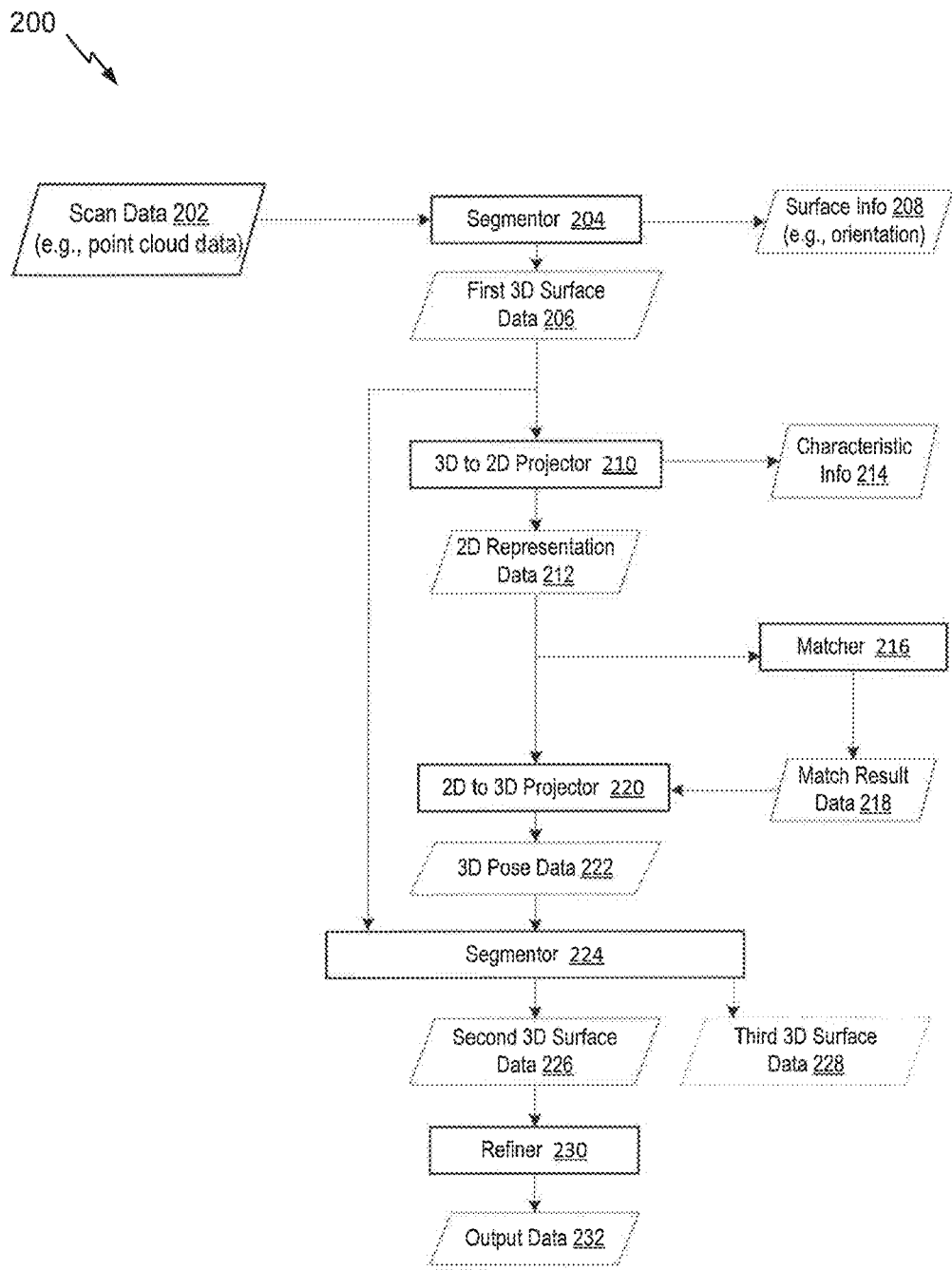
FIG. 2 illustrates a block diagram of an example of a system for processing point cloud data.

Referring to FIG. 2, a block diagram of an example of a system 200 for processing point cloud data is shown. The system 200 may include or correspond to the electronic device 120 (e.g., the processor 122).

The system 200 includes segmentor 204, 3D to 2D projector 210, matcher 216, 2D to 3D projector 220, segmentor 224, and refiner 230. In some implementations, segmentor 204 and segmentor 224 may be the same segmentor. One or more of segmentor 204, 3D to 2D projector 210, matcher 216, 2D to 3D projector 220, segmentor 224, and refiner 230 may be implemented as electronic hardware, computer software, or combinations of both.

During operation of system 200, segmentor 204 receives scan data 202, such as point cloud data. The scan data 202 may include or correspond to scan data 180. Segmentor 204 may be configured generate first 3D surface data 206 that includes a portion of scan data 202. For example, segmentor 204 may be configured to perform one or more operations as described herein at least with reference to FIG. 5. First 3D surface data 206 may include or correspond to first surface data 130. In some implementations, the first 3D surface data 206 may correspond to a planar surface. As part of generating first 3D surface data 206, segmentor 204 may generate surface information 208, such as orientation information (e.g., plane normal and plane eigenvectors). Segmentor 204 may provide first 3D surface data 206 to 3D to 2D projector 210 and to segmentor 224.

The 3D to 2D projector 210 may be configured to project first 3D surface data 206 to 2D representation data 212 (e.g., 2D image data). For example, 3D to 2D projector 210 may be configured to perform one or more operations as described herein at least with reference to FIG. 6. The 2D representation data 212 may include or correspond to 2D representation data 132. To project first 3D surface data 206 to 2D representation data 212, 3D to 2D projector 210 may generate characteristic information, such as plane center and one or more eigenvectors. 3D to 2D projector 220 may provide 2D representation data 212 to matcher 216 and 2D to 3D projector 220.

Matcher 216 may be configured to match 2D representation data 212 to one or more 2D templates to detect an object. The one or more 2D templates may include or correspond to 2D template(s) 146. Matcher 216 may be configured to perform one or more operations as described herein at least with reference to FIG. 7. In response to identification of a match, matcher 216 provides match result data 218 to 2D to 3D projector 220. For example, match result data may include or correspond to match result data 134. In some implementations, matcher 216 may identify multiple matches, such a first 2D template that matches a first portion of 2D representation data 212 and a second 2D template that matches a second portion of 2D representation data 212.

The 2D to 3D projector 220 may be configured to project 2D representation data 212 to generate 3D pose data 222. The 3D pose data 222 may include or correspond to pose data 136. The 2D to 3D projector 220 may generate 3D pose data 222 based on 2D matching result data 218 and characteristic information 214 (e.g., plane center and plane eigenvector). For example, 2D to 3D projector 220 may perform one or more operations as described further herein with reference to FIG. 4. The 2D to 3D projector 220 may provide 3D pose data 222 to segmentor 224.

Segmentor 224 may be configured to segment first 3D surface data 206 into at least second 3D surface data 226. For example, segmentor 224 may perform one or more operations as described further herein with reference to FIG. 8. Second 3D surface data 226 may include or correspond to second surface data 138. Segmentor 224 may segment first 3D surface data 206 in case the first 3D surface data 206 contains (is formed from) more than one object. If the first 3D surface data 206 contains (is formed from) more than one object, segmenting second 3D surface data 226 (corresponding to a first object) from first 3D surface data may result in third surface data 228 (corresponding to at least a second object). Segmentor 224 may provide second 3D surface data 226 to refiner 230.

Refiner 230 may be configured to process second 3D surface data 226 to generate output data 232. In some implementations, refiner 230 may be configured to perform dual direction ICP 3D pose refinement operations. For example, refiner 230 may perform one or more operations as described further herein with reference to FIG. 9. Refiner 230 may fine tune second 3D surface data 226 no matter whether the generated segmented plane is complete or not. Output data 232 may include or correspond to output data 140.

Thus, system 200 performs object recognition to detect an object (e.g., an object having planar surface) and recognize its 3D position and orientation. Such objection recognition and/or detection may be applied for random bin picking in a manufacturing and robotic industry application. The system 200 does not rely on 2D texture, avoids unreliable 3D feature extraction, and enhances the overall efficiency and accuracy of object recognition. For example, the overall efficiency and accuracy may be improved for objects having planar surfaces or features. Additionally, the system 200 advantageously shortens computation time by performing plane segmentation (e.g., planar segmentation), reduces time and accuracy by combining performing 2D matching, and improves accuracy on incomplete object point clouds by performing dual direction ICP.

Referring to FIGS. 3A-3G, examples of images to illustrate aspects of operation of the system 100 of FIG. 1 and system 200 of FIG. 2 are depicted. Each of the images are for illustration purposes and is not intended to be limiting.

Figure 3A:
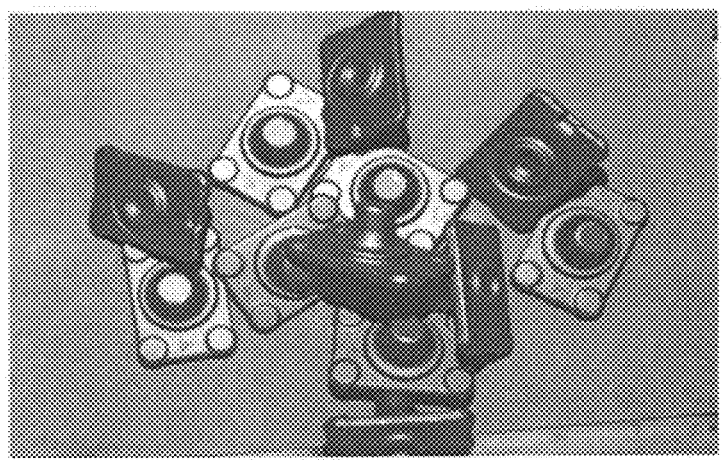
FIGS. 3A-3G depict examples of images to illustrate aspects of operation of the system of FIG. 1.
Figure 3B:
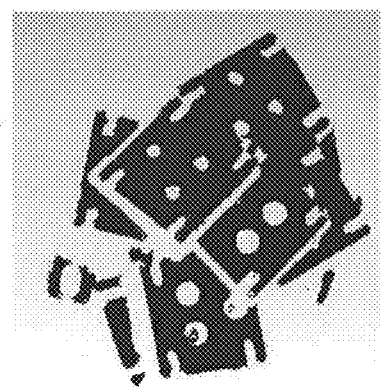

Referring to FIG. 3A, an image 300 illustrates an example of a field of view. As shown, image 300 includes multiple objects. For example, the field of view may include or correspond to field of view 176. Referring to FIG. 3B, an image 308 illustrates an example of point cloud data. For example, the point cloud data may include or correspond to scan data 180 or scan data 202.

Figure 3C:
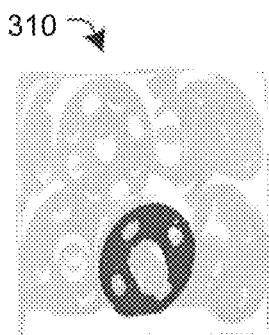
Figure 3C:
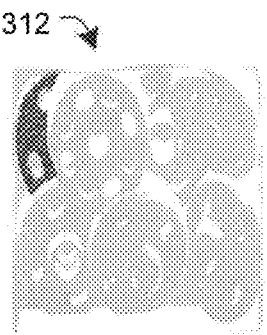
Figure 3C:
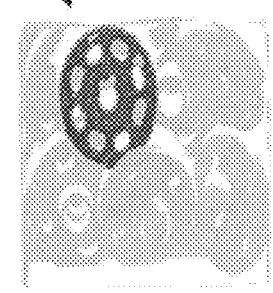
Figure 3C:
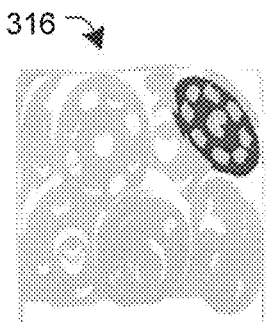
Figure 3C:
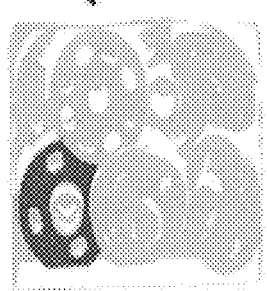
Figure 3C:
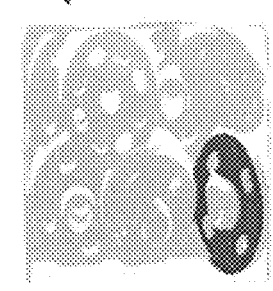

Referring to FIG. 3C, images 310-320 illustrate examples of surfaces (e.g., planes) identified based on point cloud data, such as scan data 180 or scan data 202. The surfaces may be identified by electronic device 120 (e.g., processor 122) or segmentor 204. A first image 310 indicates a first surface (e.g., a shaded portion of first image 310) identified and segmented from the point cloud data. A second image 312 indicates a second surface (e.g., a shaded portion of second image 312) identified and segmented from the point cloud data. A third image 314 indicates a third surface (e.g., a shaded portion of third image 314) identified and segmented from the point cloud data. A fourth image 316 indicates a fourth surface (e.g., a shaded portion of fourth image 316) identified and segmented from the point cloud data. A fifth image 318 indicates a fifth surface (e.g., a shaded portion of fifth image 318) identified and segmented from the point cloud data. A sixth image 320 indicates a sixth surface (e.g., a shaded portion of sixth image 320) identified and segmented from the point cloud data.

Figure 3D:
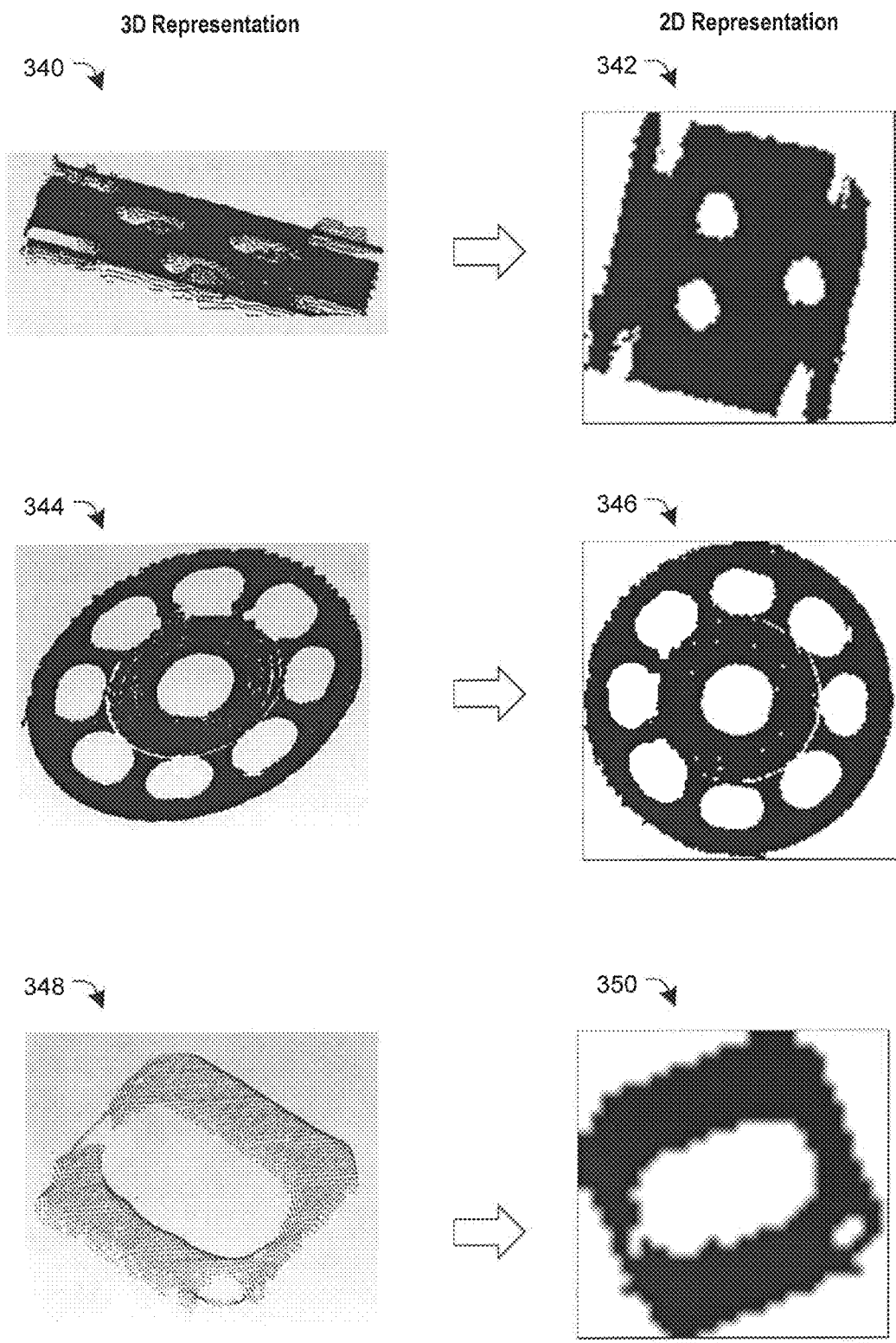

Referring to FIG. 3D, images 340-350 illustrate examples of 3D to 2D projection. For example, FIG. 3D includes a first set of images 340, 344, 348 and a second set of images 342, 346, 350. First set of images 340, 344, 348 illustrate 3D point cloud data, such as first surface data 130 or first 3D surface data 206. Second set of images 342, 346, 350 illustrate 2D projections (e.g., 2D representations of the 3D point cloud data), such as 2D representation data 132 or 2D representation data 212. The 3D to 2D projection may be performed by electronic device 120 (e.g., processor 122) or 3D to 2D projector 210. As shown, 3D point cloud data represented by image 340 is projected to 2D representation data as illustrated by image 342. As another example, 3D point cloud data represented by image 344 is projected to 2D representation data as illustrated by image 346. As another example, 3D point cloud data represented by image 348 is projected to 2D representation data as illustrated by image 350.

Figure 3E:
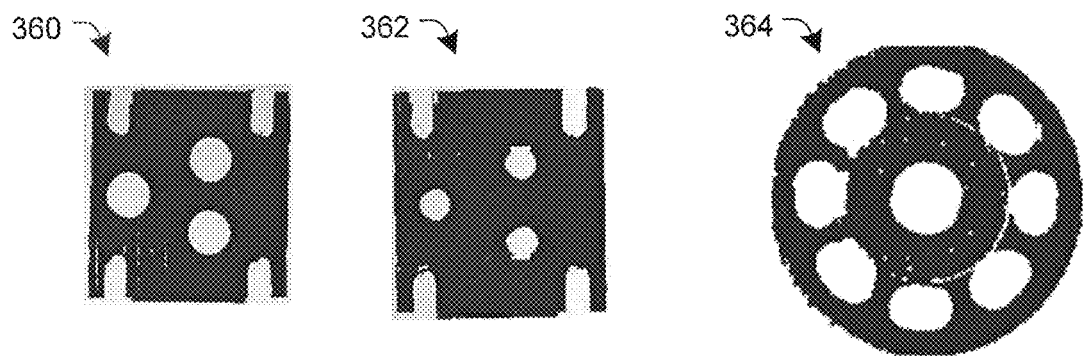

Referring to FIG. 3E, images 360-364 illustrate examples of template data (e.g., 2D template data). For example, the template data may include or correspond to 2D template(s) 146. As shown, image 360 corresponds to template data associated with a first object. As another example, image 362 corresponds to template data associated with a second object. As another example, image 364 corresponds to template data associated with a third object.

Figure 3F:
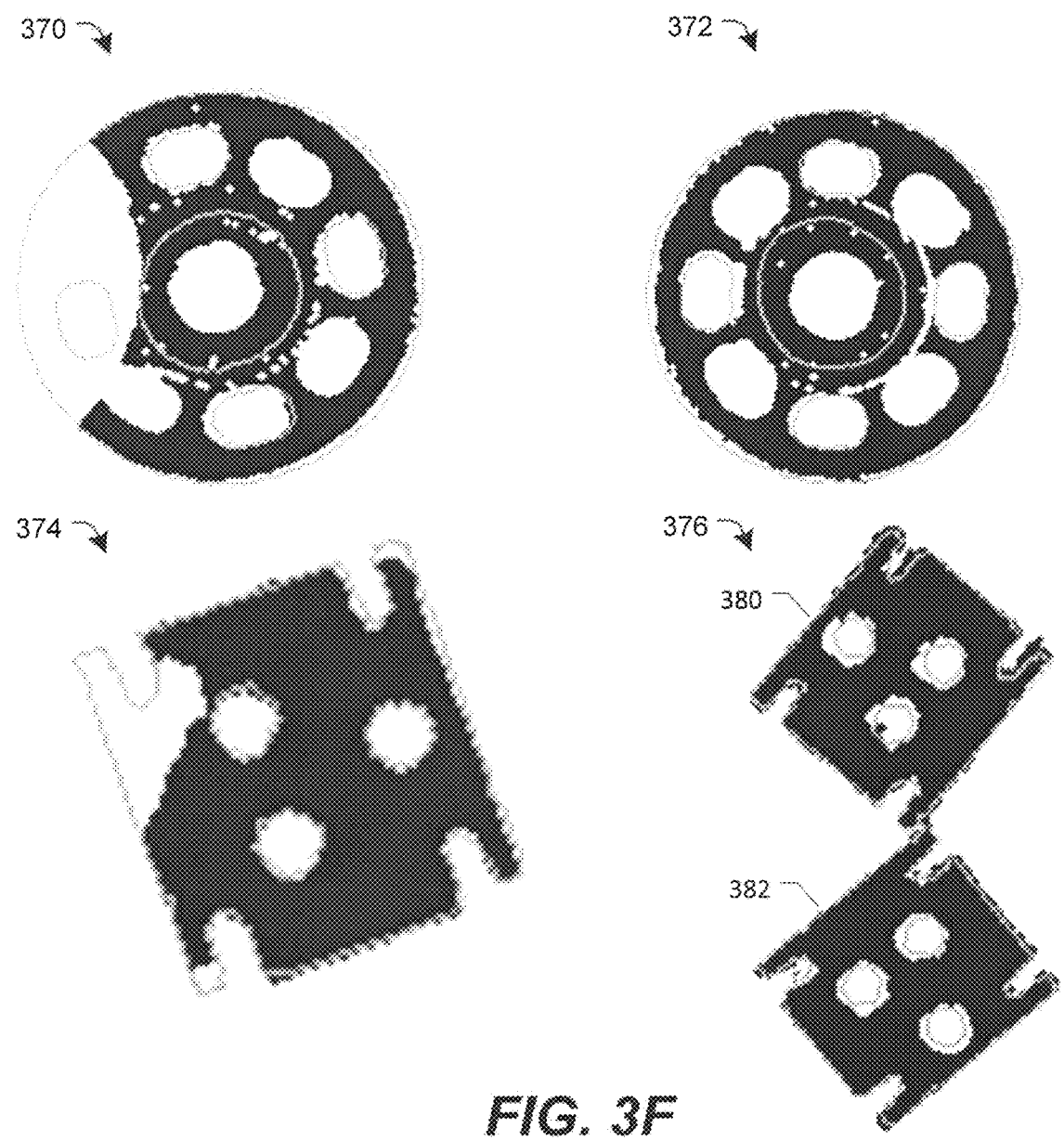

Referring to FIG. 3F, images 370-376 illustrate examples 2D matching operations. To illustrate, 2D template data (e.g., 146) may be matched to 2D representation data (e.g., 132, 212). For example, the 2D matching operations may be performed by electronic device 120 (e.g., processor 122) or matcher 216. As shown, image 370 depicts a 2D template (e.g., object outline) overlaid on 2D representation data. As another example, image 372 depicts a 2D template (e.g., object outline) overlaid on 2D representation data. Image 374 depicts a 2D template (e.g., object outline) overlaid on 2D representation data. As another example, image 376 depicts a first template 280 and a second template 382 overlaid on 2D representation data. With reference to image 376, the 2D representation generated based on an identified 3D surface that contains (is formed from) more than one object, such as two objects next to or touching each other.

Figure 3G:
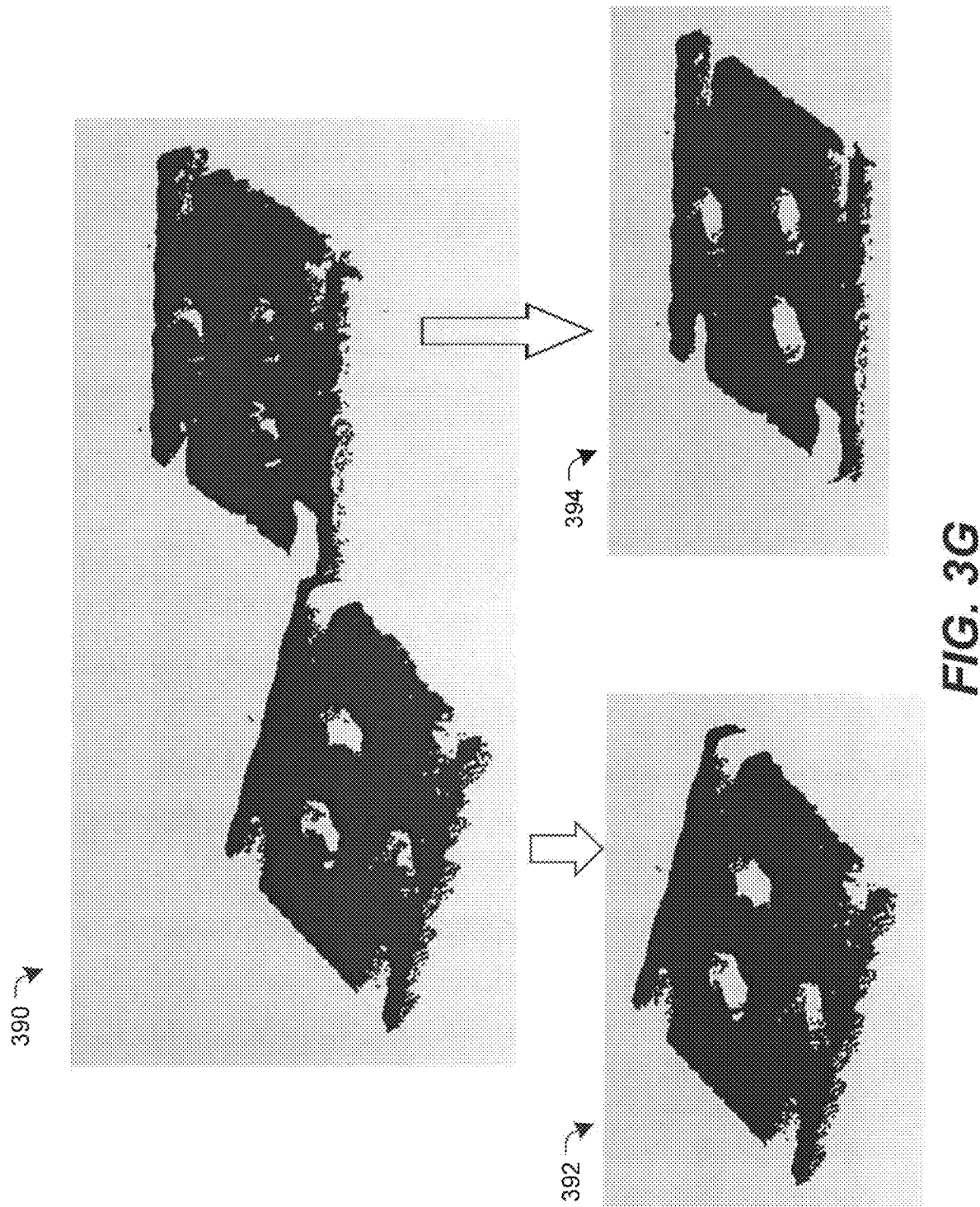

Referring to FIG. 3G, images 390-394 illustrate an example of segmentation based on identification of a matched result. For example, the segmentation may be performed by electronic device 120 (e.g., processor 122) or segmentor 224. As shown, image 390 indicates a first surface identified and segmented from the point cloud data. For example, the surface (e.g., a plane) may include or correspond to first surface data 130 or first 3D surface data 206. The first surface data may have been generated based on an identified 3D surface that contains (is formed from) more than one object, such as two objects next to or touching each other. The first surface (e.g., first 3D surface data) may be segmented, based on a first matching result of an object template, to generate second surface data, such as second 3D surface data 138 or second 3D surface data 226, as illustrated by image 392. Additionally, or alternatively, the first surface (e.g., first 3D surface data) may be segmented, based on a second matching result of an object template, to generate third surface data, such as third 3D surface data 228, as illustrated by image 394. In some implementations, segmentation of the second surface data from the first surface data may result in (e.g., generate) the third surface data. In other implementations, segmentation of the second surface data from the first surface data may result in a portion of the first surface data and the third surface data may be segmented from the portion of the first surface data.

Figure 4:
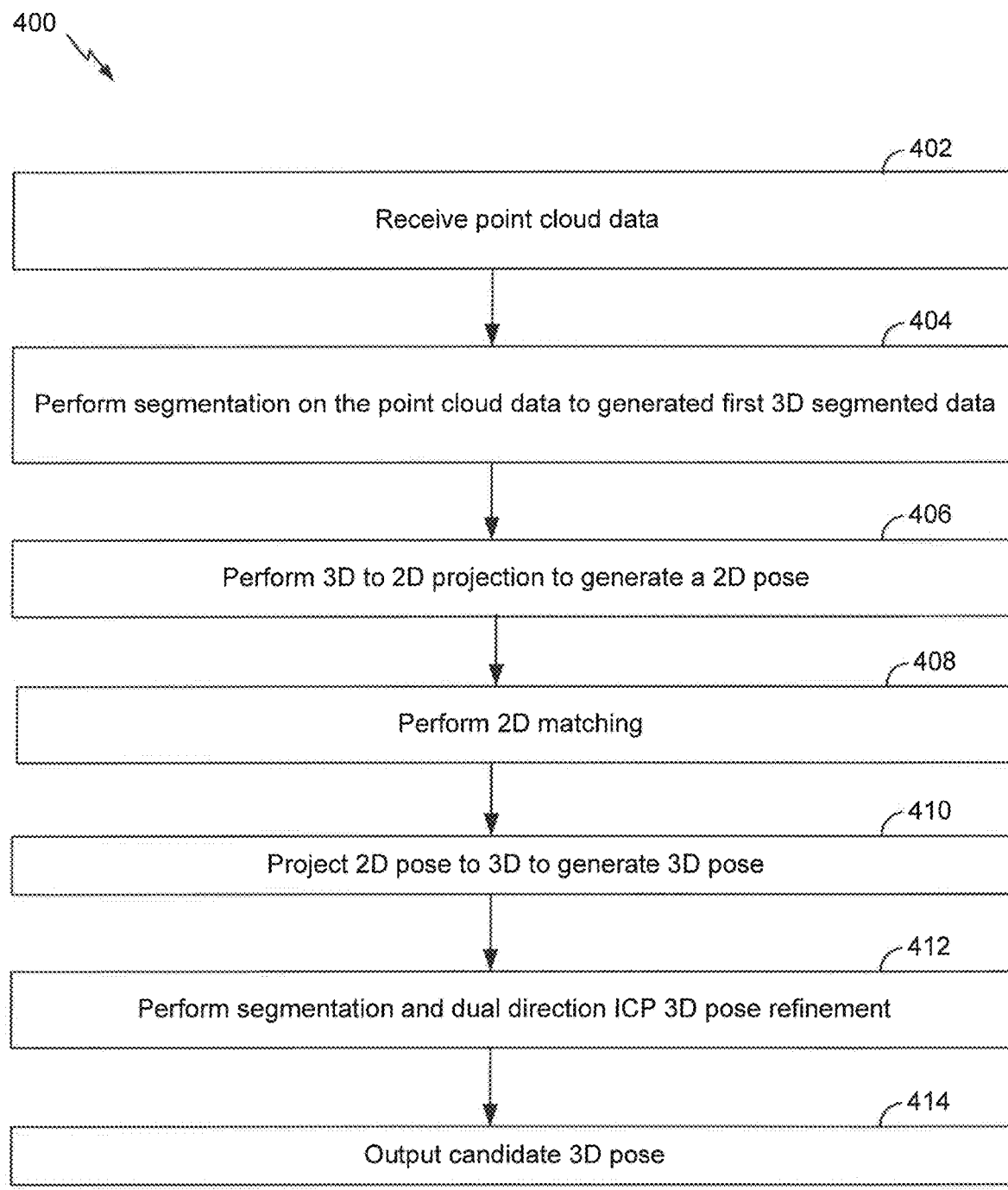
FIG. 4 is a flowchart of an illustrative method of processing point cloud data.

Referring to FIG. 4, a method 400 of performing object recognition is shown. For example, the method 400 may be used for planar object recognition based on 3D point cloud data for random bin picking in a manufacturing environment. The method 400 may be performed by electronic device 120 (e.g., processor 122), one or more components of system 200, one or more processors, or a combination thereof.

The method 400 includes receiving point cloud data, at 402. For example, the point cloud data may include three dimensional (3D) point cloud data of the object. The point cloud data may include or correspond to scan data 180 or the scan data. The method 400 further includes performing segmentation on the point cloud data to generate first 3D segmented data, at 404. For example, the segmentation may be performed by segmentor 204 or as described further herein with reference to at least FIG. 5. In some implementations, the segmentation may include plane segmentation in which partial orientation information (e.g. plane normal) is extracted during and/or after segmentation. Additionally or alternatively, during segmentation, candidate planes having too few points may be discarded to eliminate noise and eliminate processing heavily occluded plane. To illustrate, a candidate plane may be compare to a threshold number of points and may be discarded if the number of points included in the candidate plane does not satisfy the threshold. Additionally, by identifying and processing candidate planes for future processing, an amount of points of the point cloud for further processing may be reduced resulting in faster and more efficient object recognition.

The method 400 further includes performing 3D to 2D projection to generate a 2D pose, at 406. For example, 3D to 2D projection may be performed by the 3D to 2D projector 210 or as described further herein at least with reference to FIG. 6. The 3D to 2D projection may include generating characteristic information, such as characteristic information 214. In some implementations, 3D to 2D projection may be performed for a matching operation, such as 2D chamfer matching. During the 3D to 2D projection, a center point and normal information of a selected plane may be identified and the plane may be project to 2D.

The method 400 further includes performing 2D matching, at 408. For example, 2D matching may be performed by matcher 216 or as describe further herein at least with reference to FIG. 7. By performing 2D matching rather than a 3D matching operation, objection recognition may be performed faster and more efficiently than conventional techniques which perform 3D feature extraction and matching.

The method 400 also includes projecting 2D pose to 3D to generate 3D pose, at 410. For example, 2D pose to 3D projection may be performed by 2D to 3D projector 220. Performing the 2D pose to 3D projection may project a 2D pose to 3D by combining 2D matching result with 3D info (e.g., plane center and plane eigenvector) to get a 3D pose. To illustrate, 2D pose to 3D projection may be defined by the equation equations:

$$Trans_{3D} = T_{center} + \begin{pmatrix} Eigenvector1 \\ Eigenvector2 \\ Eigenvector3 \end{pmatrix}' \times \begin{pmatrix} x_{2D} \\ y_{2D} \\ 0 \end{pmatrix}; \text{ and}$$

$$Rot_{3D} = \begin{pmatrix} Eigenvector1 \\ Eigenvector2 \\ Eigenvector3 \end{pmatrix}' \times \begin{pmatrix} \cos\theta & -\sin\theta & 0 \\ \sin\theta & \cos\theta & 0 \\ 0 & 0 & 1 \end{pmatrix};$$

where $Trans_{3D}$ and $Rot_{3D}$ are projected 3D translation and rotation, where $x_{2D}$, $y_{2D}$, and $\theta$ are values from the 2D matching result, and where $T_{center}$ and Eigenvector are plane center and plane eigenvectors.

The method 400 includes performing segmentation and dual direction iterative closest point (ICP) 3D pose refinement, at 412. For example, segmentation may be performed by segmentor 224 or as described herein at least with reference to FIG. 8, and dual direction ICP 3D pose refinement may be performed by refiner 230 or as described further herein at least with reference to FIG. 9. Performing the 3D segmentation may include performing segmentation of an initial plane based on the 3D pose in case the initial plane contains (is formed from) more than one object. Performing the dual direction ICP may fine tune the 3D pose no matter whether the generated segmented plane is complete or not. The method 400 further includes outputting an output candidate 3D pose, at 414. For example, the output candidate 3D pose may include or correspond to output data 140 of FIG. 1.

Thus, method 400 may beneficially provide 3D object recognition, such as object recognition in a manner that can be applied in manufacturing and robotic industry applications. For example, method 400 can detect planar object, classify the object, and recognize its 3D position and orientation for random bin picking. Additionally, method 400 may advantageously perform the 3D object recognition without 2D color/texture information and without performing unreliable 3D feature extraction operations. Accordingly, method 400 enhances the overall efficiency and accuracy of object recognition, such as object recognition for planar parts object. Additionally, method 400 advantageously segments point cloud data for future processing which reduces an amount of points of the point cloud for further processing, resulting in faster and more efficient object recognition. Method 400 also beneficially performs dual direction ICP which may c produce a fine-tuned pose that compensates for one or more occluded point cloud data points. Further, method 400 performs 2D matching, which may be performed faster and more efficiently than conventional techniques which perform 3D feature extraction and matching, and may accurately recognize planar part and/or parts that have a relatively planar surface.

Figure 5:
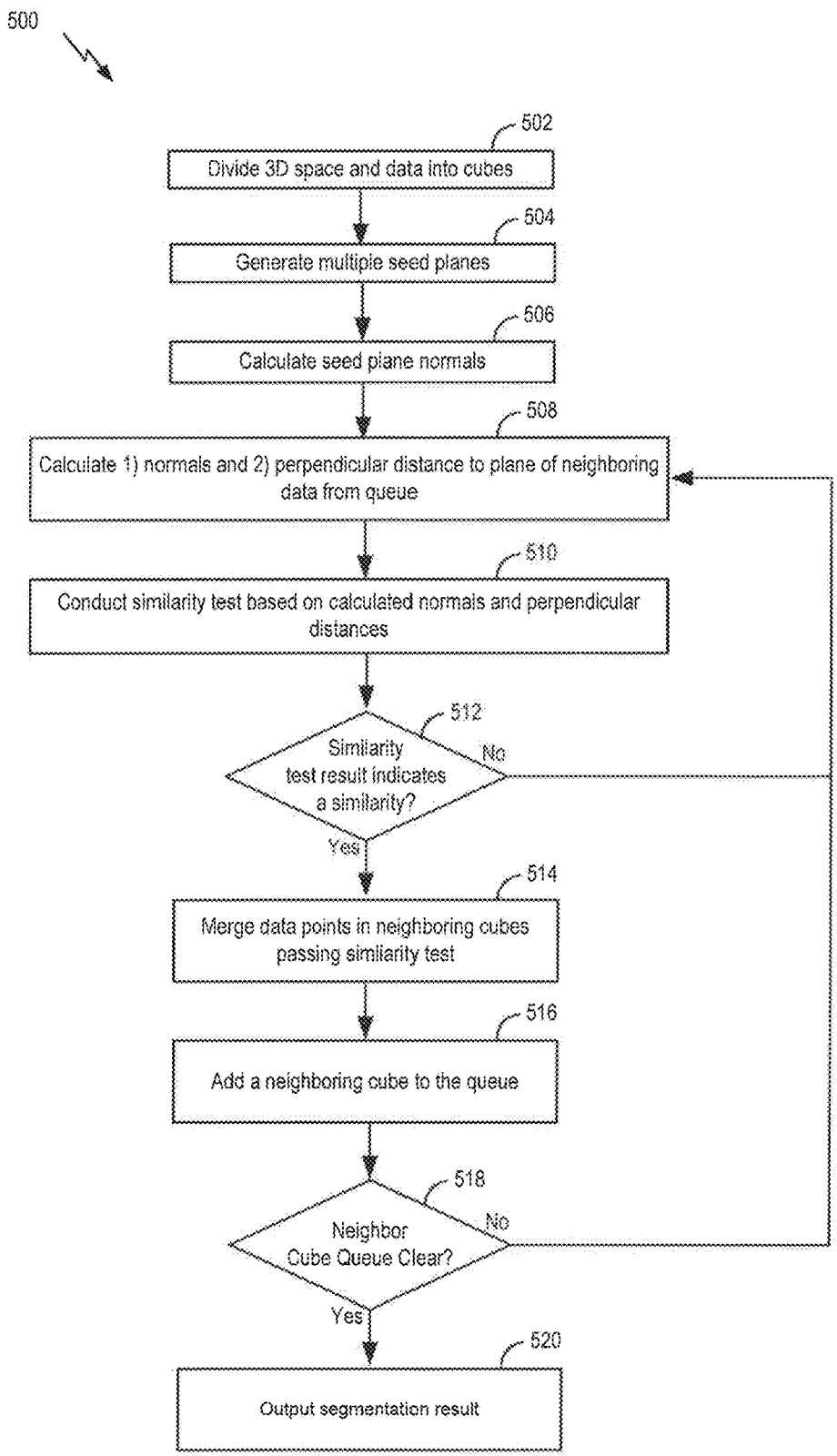
FIG. 5 is a flowchart of an illustrative method of performing segmentation.

Referring to FIG. 5, a method 500 of performing plane segmentation is shown. The plane segmentation is used to identify planes in the field of view (FOV), such as FOV 176. The plane segmentation may include or correspond to segmentor 204 or step 404 of FIG. 4. The plane segmentation/detection algorithm may utilize voxel growing technique. A resolution of voxel may be decided by the target object to detect. The resolution may be from 0.5 millimeters (mm) to 2 mm, as an illustrative, non-limiting example. The method 500 may be performed by electronic device 120 (e.g., processor 122), one or more components (e.g., segmentor 204 or segmentor 224) of system 200, one or more processors, or a combination thereof.

The method 500 includes dividing 3D space and data include cubes, at 502, and generating multiple seed planes, at 504. The multiple seed planes may be initialized and grown at the same time. The number of seeds depends on the size of the input data and the size of target object. As an illustrative, non-limiting example, the number of seeds may range from 10 to 100.

The method 500 further includes calculating seed plane normals, at 506. The method also includes calculating normals and perpendicular distance to a plane of neighboring data from a queue, at 508. The method also includes conducting a similarity test based on the calculated normals and the perpendicular distances, at 510. If the similarity test result does not indicate a similarity, the method 500 advances to 508. Alternatively, if the similarity test result indicates a similarity, the method 500 advances to 514.

The method 500 includes, at 514, merging data points in neighbouring cubes passing similarity test. To illustrate, the seed planes may merge neighbouring data by estimating normal difference α, perpendicular distance β to plane, and connectivity. Values of α and β may depend on the shape of target object (to be detected). As illustrative, non-limiting examples, the values of α and β may range from 10 to 90 degrees and 0.5 to 3 mm, respectively. The seed planes are merged together by estimating normal difference α and plane connectivity C. For seed plane connectivity C between two seed planes (e.g., seed plane A and seed plane B), the seed plane connectivity C may be defined by the number of voxels that are searched by both seed plane A and seed plane B.

The method 500 further includes adding a neighboring cube to the queue, at 516. To illustrate, the method 500 may include maintaining a queue for each seed plane, at 516, and this queue may store potential cubes that could be used as growing directions for subsequent growing iterations for each seed plane. The method 500 also includes determining whether the neighbor cube queue is clear, at 518. If a determination is made that the neighbor cube queue is not clear, the method 500 advances to 508. Alternatively, if a determination is made that the neighbor cube queue is clear, the method 500 advances to 520. The method 500 includes outputting a segmentation result, at 520. The segmentation result may include or correspond to first surface data 130 or first 3D surface data 206.

Figure 6:
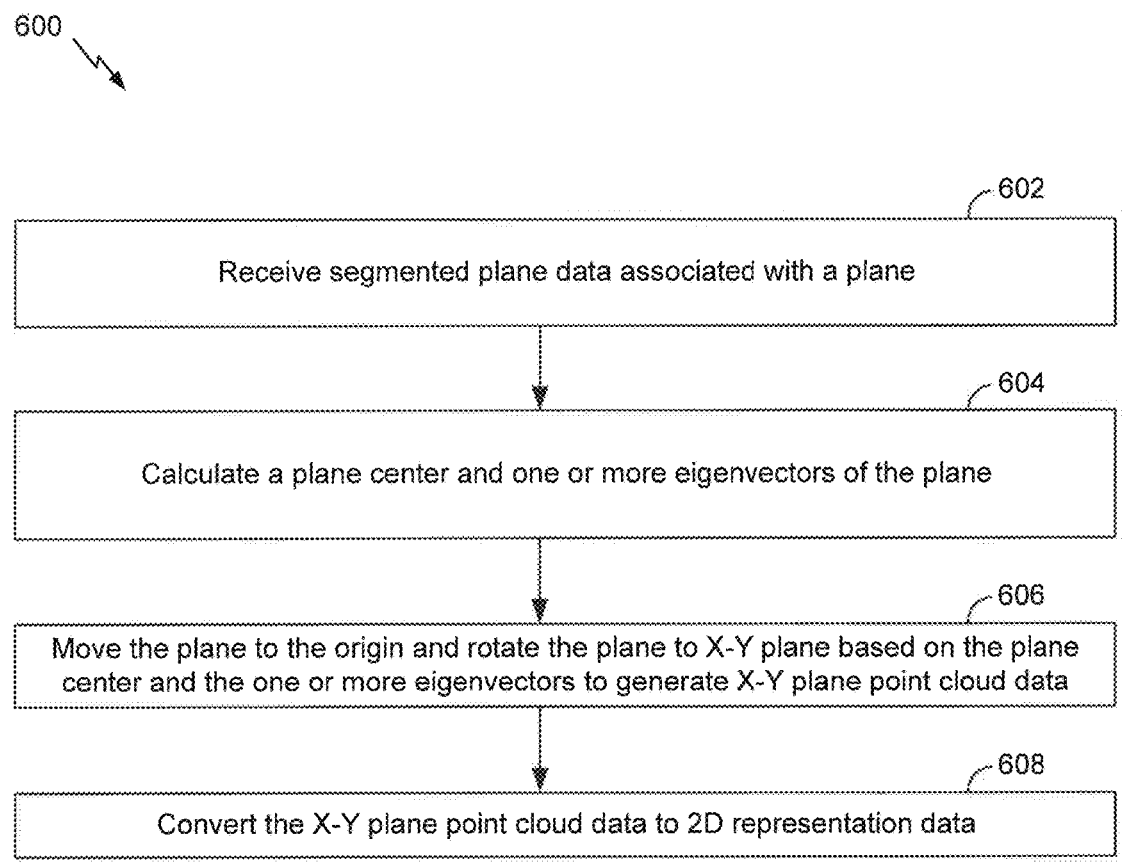
FIG. 6 is a flowchart of an illustrative method of performing 3D to 2D projection.

Referring to FIG. 6, a method 600 of performing 3D to 2D projection is shown. The 3D to 2D projection may include or correspond to 3D to 2D projector 210 or step 406 of FIG. 4. The 3D to 2D projection may be used to project a detected surface (e.g., first 3D surface data 130 or first 3D surface data 206) to 2D images using plane center and eigenvectors. The detected surface may include a planar surface. The point cloud information of the detected surface (e.g., first 3D surface data 130 or first 3D surface data 206) is transformed by its plane center and smallest eigenvector and projected to X-Y plane. The X-Y plane point cloud is converted to 2D image by a predefined resolution. The predefined resolution has a range from 0.8 mm to 3.2 mm depends on the size of the target object. The method 400 may be performed by electronic device 120 (e.g., processor 122), one or more components (e.g., 3D to 2D projector 210) of system 200, one or more processors, or a combination thereof.

The method 600 includes receiving segmented plane data associated with a plane, at 502. For example, the segmented plane data may include or correspond to the first surface data 130 or the first surface data 206. The method 600 further includes calculating a plane center and one or more eigenvectors of the plane. For example, the plane center and the one or more eigenvectors may include or correspond to the characteristic information 214. The method 600 also includes moving the plane to the origin (of a coordinate system) and rotating the plane to an X-Y plane based on the plane center and the one or more eigenvectors to generate X-Y plane point cloud data, at 606. The method includes converting the X-Y plane point cloud data to 2D representation data, at 608. The 2D presentation data may include or correspond to the 2D representation data 132 or the 2D representation data 212.

Figure 7:
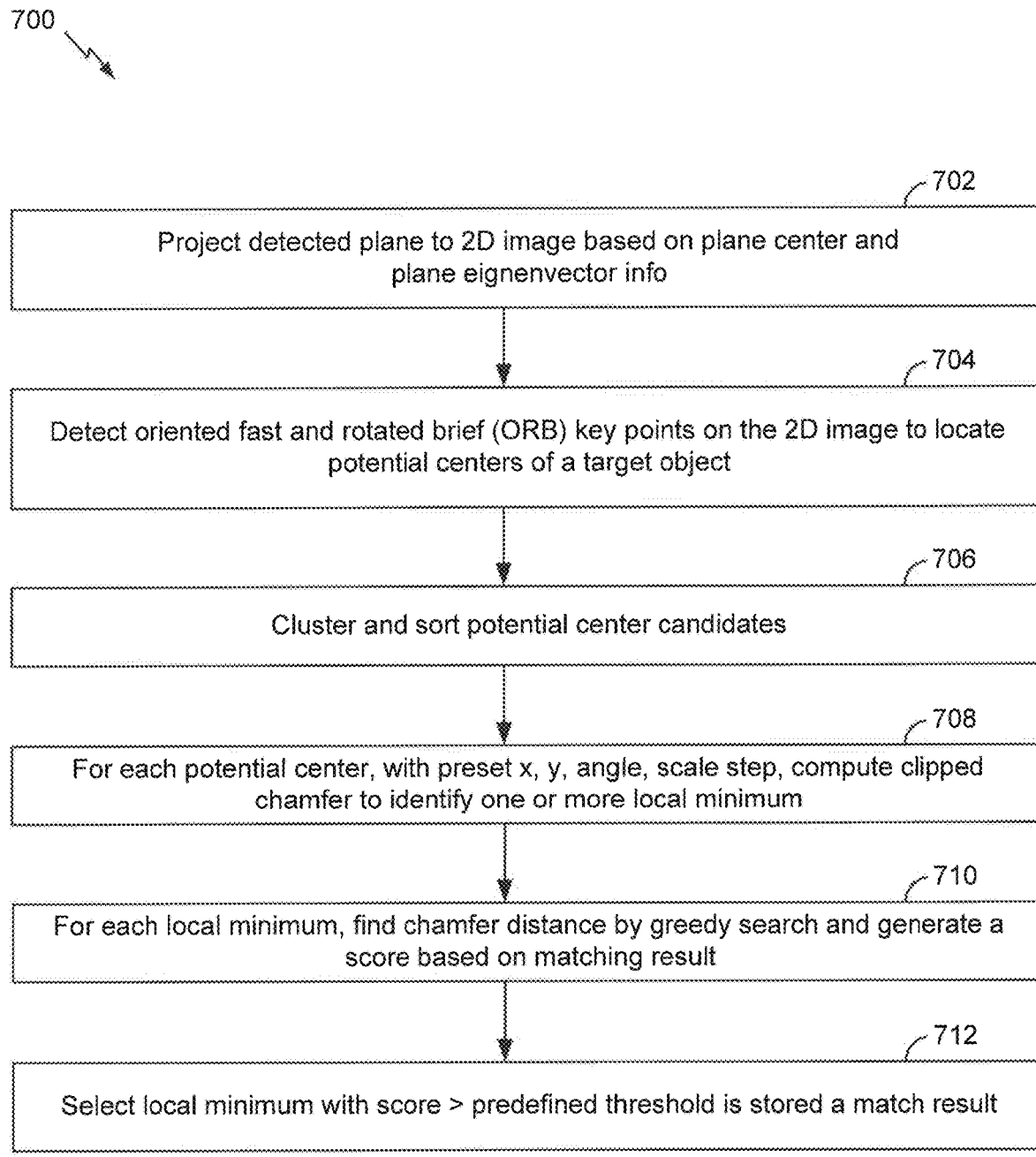
FIG. 7 is a flowchart of an illustrative method of performing a matching operation.

Referring to FIG. 7, a method 700 of performing 2D matching is shown. For example, method 700 describes 2D chamfer matching, which may be used to find objects in a 2D image (e.g., 2D representation data). The 2D matching may include or correspond to matcher 216 or step 408 of FIG. 4. The method 700 may be performed by electronic device 120 (e.g., processor 122), one or more components (e.g., matcher 216) of system 200, one or more processors, or a combination thereof.

The method 700 includes projecting a detected plane to a 2D image based on plane center and plane eigenvector information, at 702. Projecting the detected plane may include or correspond to method 600 of FIG. 6.

The method 700 further includes detecting oriented fast and rotated brief (ORB) key points on the 2D image to locate potential centers of a target object, at 704. The method also includes clustering and sorting potential center candidates, at 706. The method 700 includes, for each potential center, with preset x, y, angle, scale step, computing clipped chamfer to identify one or more local minimum, at 708. The method 700 also includes, for each local minimum, finding chamfer distance by greedy search and generating a score based on matching result, at 710. The method 700 includes selecting a local minimum with a score greater than or equal to a threshold that is stored as a match result, at 712. The match result may include or correspond to the match result data 134 or the match result data 218.

In some implementations, a matching algorithm, as described with reference to FIG. 7, utilizes a key point matching technique and chamfer matching technique. The matching algorithm is divided into template phase and query phase. During the template phase, a template is formed. During the query phase, the template is matched against query image to obtain a matching pose.

The template is formed from a template image by key point detection, descriptor computation, contour extraction, contour edge orientation extraction. The template image is obtained by projection of template 3D point cloud. The different angle of templates are computed and stored in hash table for matching in query phase. For example, the hash table may be stored in memory 124. For the key point matching technique, Oriented FAST and Rotated BRIEF (ORB) is utilized as key point detector and descriptor. For the key point matching technique, matches are provided as input guess coordinates to chamfer matching phase.

For the chamfer matching technique, the clipped chamfer distance with orientation multiplier is computed at different positions and orientations of template in the neighborhood of input guess coordinates in the query image exhaustively. All local minimum obtained are subjected to a greedy search. In some implementations, all local minimum obtained are subjected to a greedy search. A local minimum with score greater than a threshold is preserved as algorithm results of 2D chamfer matching.

The clipped chamfer distance with orientation multiplier is defined by:

$$dist = \frac{1}{n}\sum_{i=1}^{n} d^+ * a^+;$$

$$a^+ = \vec{a}_t \cdot \vec{a}_q;$$

$$d^+ = 1 - \frac{D}{D_{Thd}};$$

where $\vec{a}_t$ and $\vec{a}_q$ are the corresponding edge orientation of the template and query image, respectively. For a particular template contour point, the closest edge point in the query image is its corresponding edge point. Additionally, in the above equations, D is the chamfer edge distance and $D_{Thd}$ is a percentage of template size. The percentage is used to determine whether an edge point in the query image is considered depending on its distance from a template edge point. With a higher percentage, edge point in query image at a location farther from model edge point is taken into consideration, leading to a higher final clipped chamfer distance with orientation multiplier. As an illustrative, non-limiting example, this value may be set within the range from 0.1 to 0.3, such that query edge points too far away from model edge points are not taken into account.

The threshold is used to determine whether a local minimum is passed to next stage of processing. As an illustrative, non-limiting example, the value of the threshold may be set within the range of 0.2-0.5, such that objects found to be too occluded or obvious incorrect objects are not considered.

Figure 8:
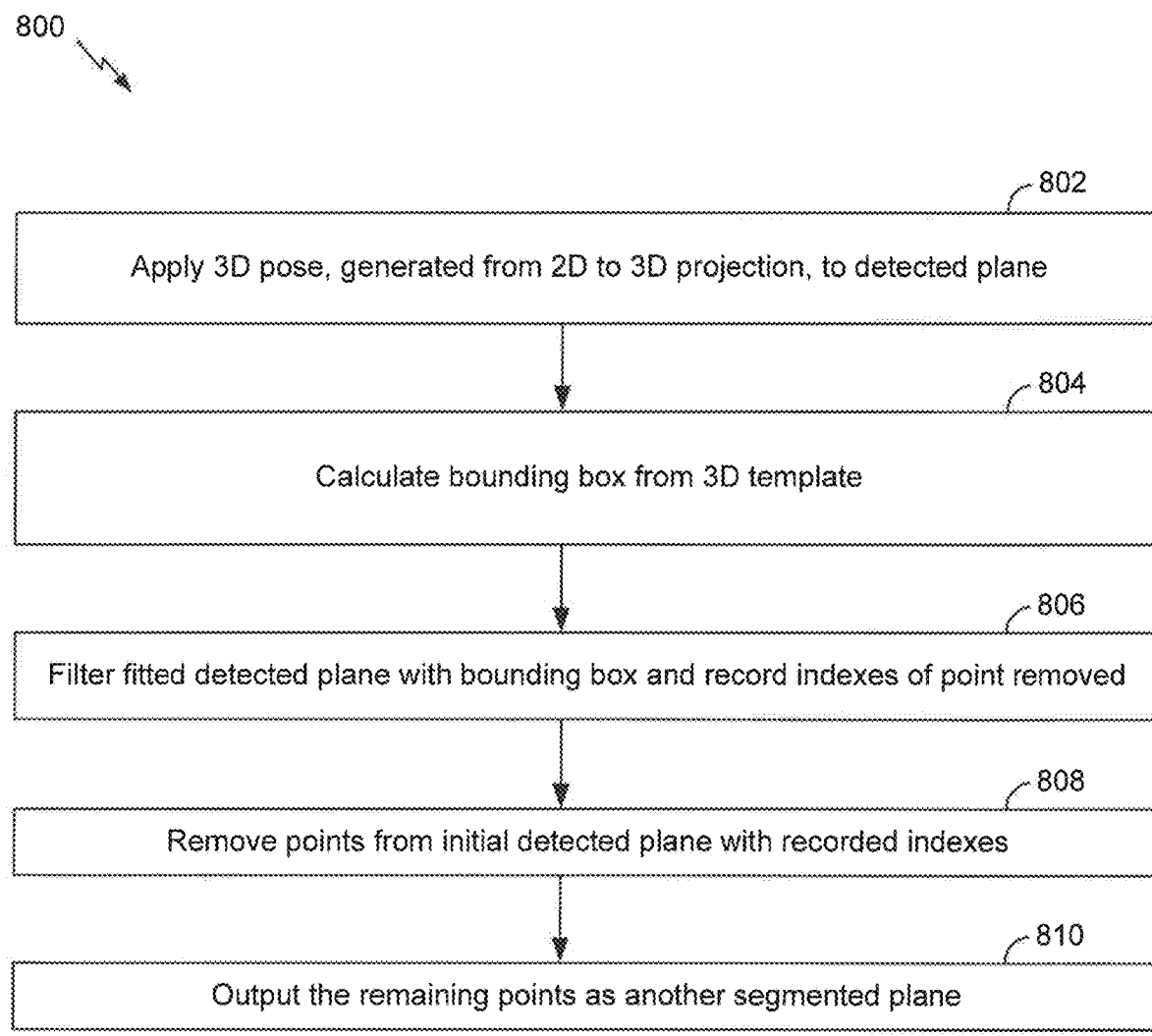
FIG. 8 is a flowchart of an illustrative method of operation of performing segmentation.

Referring to FIG. 8, a method 800 of performing 3D segmentation is shown. The 2D matching may include or correspond to segmentor 224 or step 412 of FIG. 4. Method 800 describes 3D segmentation, which may be used to cut out the 3D object plane from initial detected plane based on coarse 3D pose in case initial plane contains more than one object. The 3D segmentation may also be used to apply reversed 3D pose to initial plane to put its center of mass to origin and fit it x-y plane. This operation is defined by equation $$P = \left(\begin{pmatrix} x_1 & y_1 & z_1 \\ & \ldots & \\ x_n & y_n & z_n \end{pmatrix} - Trans_{3D}\right) \times Rot_{3D};$$

where x, y, z are from initial planes and P is transformed plane. The method 800 may be performed by electronic device 120 (e.g., processor 122), one or more components (e.g., segmentor 204 or segmentor 224) of system 200, one or more processors, or a combination thereof.

The method 800 includes applying 3D pose, generated from 2D to 3D projection, to detect a plane, at 802. For example, the detected plane may include or correspond to first surface data 130 or first 3D surface data 206. The method 800 further includes calculating a bound box from a 3D template, at 804, and filter fitting the detected plane with the bounding box and recording indexes of points removed, at 806. The filter bounding box used for segmentation is evaluated from a 3D template. In this step, it is to get the minimum and maximum values of x, y and z from corresponding 3D template and extend them by an amount, such as a percentage (e.g., 10%) to get the filter bounding box. The transformed plane with bounding box will then be filtered and the indices of points that are outside the filter bounding box will be recorded. The method 800 includes removing points from initial detected plane with recorded indexes, at 808, and outputting the remaining points as another segmented plane, at 810.

Figure 9:
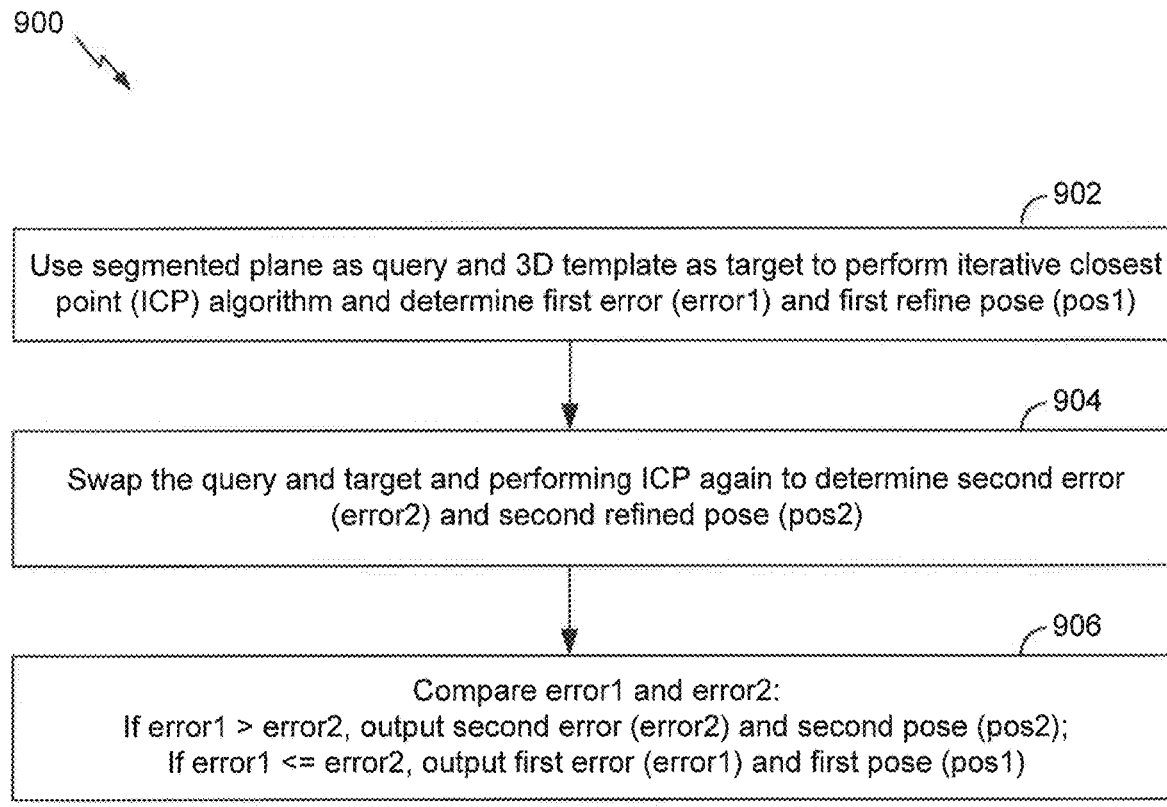
FIG. 9 is a flowchart of an illustrative method of performing a dual direction 3D iterative closest point (ICP) operation.

Referring to FIG. 9, a method 900 of performing dual direction 3D ICP is shown. The dual direction 3D ICP may include or correspond to refiner 230 or step 412 of FIG. 4. In the method 900, dual direction 3D ICP may be used to fine tune the 3D pose no matter whether the segmented plane is complete or not. The method 900 may be performed by electronic device 120 (e.g., processor 122), one or more components (e.g., refiner 230) of system 200, one or more processors, or a combination thereof.

The method 900 includes using segmented plane as query and 3D template as target to perform iterative closest point (ICP) algorithm and determine first error (error1) and first refine pose (pos1), at 902. The method 900 further includes swapping the query and target performing ICP again to determine second error (error2) and second refined pose (pos2), at 904.

The method 900 include comparing error1 and error2. If error1 is greater than error2, second error (error2) and second pose (pos2) are output. Alternatively, if error error1 is less than or equal to error2, first error (error1) and first pose (pos1) are output. In other implementations, second error (error2) and second pose (pos2) are output if error1 is greater than or equal to error2, and first error (error1) and first pose (pos1) are output if error error1 is less than to error2.

Figure 10:
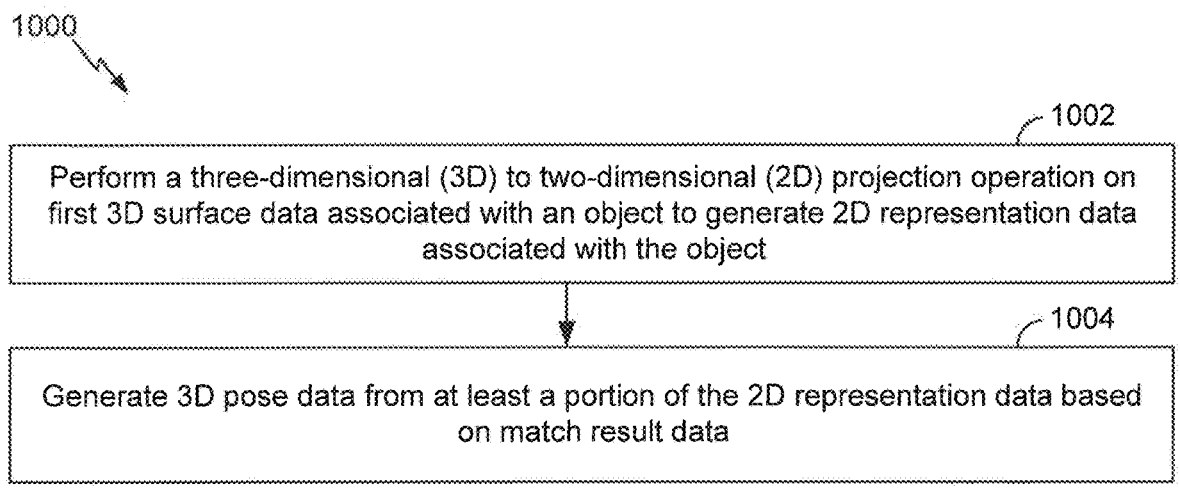
FIG. 10 is a flowchart of an illustrative method of performing object recognition.

Referring to FIG. 10, a method 1000 of performing object recognition is shown. For example, method 1000 may be used for random bin picking in a manufacturing environment. The method 1000 may be performed by electronic device 120 (e.g., processor 122), one or more components of system 200, one or more processors, or a combination thereof.

The method 1000 includes performing a three-dimensional (3D) to two-dimensional (2D) projection operation on first 3D surface data associated with an object to generate 2D representation data associated with the object, at 1002. For example, the 3D to 2D projection may include or correspond to 3D to 2D projector 210, step 406 of FIG. 4, or the method 600 of FIG. 6. The first 3D surface data may be associated with a planar surface of the object.

The method 1000 also includes generating 3D pose data from at least a portion of the 2D representation data based on match result data, at 1304. For example, the 2D to 3D projection may include or correspond to 2D to 3D projector 220, step 408, 410 of FIG. 4, or the method 600 of FIG. 6.

In some implementations, the method 1000 also includes receiving point cloud data and performing a segmentation operation on the point cloud data to generate the first 3D surface data, the first 3D surface data associated with a planar surface. For example, the segmentation operation may include or correspond to segmentor 204, step 402, 404 of FIG. 4, or the method 500 of FIG. 5. In such implementations, the method 1000 may further include performing the segmentation operation comprises identifying a seed point of the point cloud data, performing a voxel growth operation to generate the first 3D surface data, and determining a normal of the planar surface based on the first 3D surface data.

In some implementations, performing the 3D to 2D projection operation includes generating characteristic information (e.g., 214) associated with the first 3D surface data. The characteristic information may include a plane center data and eigenvector data associated with one or more plane eigenvectors. In some such implementations, the 3D pose data may be further generated based on the characteristic information.

In some implementations, the method 1000 includes performing a matching operation to generate the match data result, the matching operation performed on the 2D representation data and template data associated with one or more templates. For example, the segmentation operation may include or correspond to matcher 216, step 408 of FIG. 4, or the method 700 of FIG. 7. The matching operation may include a 2D chamfer matching operation or another matching operation. The matching operations other than 2D chamfer matching may produce a 2D location and rotation output.

In some implementations, the method 1000 includes performing a segmentation operation on the first 3D surface data based on the 3D pose data to generate second 3D surface data. For example, the segmentation operation may include or correspond to segmentor 224, step 412 of FIG. 4, or the method 800 of FIG. 8. The first 3D surface data and the second 3D surface data may be the same data. Alternatively, the second 3D surface data may be a subset of the first 3D surface data (e.g., the first 3D surface data and the second 3D surface data are different). In some implementations, the segmentation operation further generates third 3D surface data. Additionally, or alternatively, the method 1000 includes selecting a 3D object template, performing an iterative closest point (ICP) operation using the second 3D surface data and the 3D object template, and output a refined 3D pose based on the ICP operation. For example, the segmentation operation may include or correspond to refiner 230, step 412 of FIG. 4, or the method 900 of FIG. 9.

The method 1000 of FIG. 10 enables detection/recognition of an object (e.g., an object having planar surface) and recognition of its 3D position and orientation. Such detection and/or recognition may be used and applied for random bin pick in a manufacturing and robotic industry application. The method 1000 performs objection detection and/or recognition without relying on 2D color/texture, without performing unreliable 3D feature extraction. Additionally, the method 1000 advantageously enhances the overall efficiency and accuracy of object recognition. For example, the overall efficiency and accuracy may be improved for objects having planar surfaces or features.

The process shown or described in any of the systems of FIGS. 1-2, the methods of FIGS. 4-10, or a combination thereof, may be controlled by a processing unit such as a central processing unit (CPU), a controller, a field-programmable gate array (FPGA) device, an application-specific integrated circuit (ASIC), another hardware device, firmware device, or any combination thereof. As an example, any of the systems of FIGS. 1-2, the methods of FIGS. 4-10, or a combination thereof, can be performed by one or more processors that perform object recognition. Additionally, a first portion of one of the process described in the systems of FIGS. 1-2 or methods of FIGS. 4-10 may be combined with at least a second portion of another one of the process described in the systems of FIGS. 1-2 or methods of FIGS. 4-10. For example, a first portion of the method 1000 of FIG. 10 may be combined with a second portion of the method 600 of FIG. 6.

Although one or more of FIGS. 1-10 may illustrate systems, apparatuses, data structures, methods, or a combination thereof, according to the teachings of the disclosure, the disclosure is not limited to these illustrated systems, apparatuses, methods, or a combination thereof. One or more functions or components of any of FIGS. 1-10 as illustrated or described herein may be combined with one or more other portions of another function or component of FIGS. 1-10. Accordingly, no single implementation described herein should be construed as limiting and implementations of the disclosure may be suitably combined without departing from the teachings of the disclosure.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1-2 may include processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for performing object recognition, the method comprising:
    performing a three dimensional (3D) to two-dimensional (2D) projection operation on first 3D surface point cloud data associated with an object using a normal of a planar surface within the first 3D surface point cloud data by transforming the first 3D surface point cloud data into X-Y plane point cloud data and converting the X-Y plane point cloud data to a 2D image according to a predefined resolution to generate 2D representation data associated with the object;
    performing chamfer matching with respect to the 2D image to obtain match result data including a 3D translation value and a 3D rotation value for the object;
    generating 3D pose data for the object from at least a portion of the 2D representation data based on the 3D translation value and the 3D rotation value from the match result data and;
    segmenting the first 3D surface point cloud data, based on the 3D pose data, to generate at least second 3D surface point cloud data;
    generating output data based, at least in part, on the 3D pose data and the at least second 3D surface point cloud data; and
    recognizing the object based on the output data.

2. The method of claim 1, wherein the first 3D surface point cloud data is associated with a planar surface of the object.

3. The method of claim 1, wherein the transforming the first 3D surface point cloud data into the X-Y plane point cloud data comprises determining a center point corresponding to the planar surface and a smallest eigenvector corresponding to the planar surface and using the center point and the smallest eigenvector to effectuate the transforming.

4. The method of claim 1, wherein the predefined resolution has a range from 0.8 mm to 3.2 mm.

5. The method claim 1, wherein the segmenting comprises:
   identifying a seed point of the first 3D surface point cloud data;
   performing a voxel growth operation to generate the first 3D surface point cloud data; and
   determining the normal of the planar surface based on the first 3D surface point cloud data.

6. The method claim 1, wherein the performing the 3D to 2D projection operation comprises generating characteristic information associated with the first 3D surface point cloud data, and wherein the match result data comprises an x coordinate of a Cartesian coordinate system, a y coordinate of the Cartesian coordinate system, and a 2D angle.

7. The method of claim 6, wherein the characteristic information comprises a plane center data and eigenvector data associated with one or more plane eigenvectors.

8. The method of claim 1, wherein the performing chamfer matching comprises determining a clipped chamfer distance with an orientation multiplier.

9. The method of claim 1, wherein the segmenting the first 3D surface point cloud data comprises generation of third 3D surface point cloud data.

10. The method of claim 1, wherein the performing chamfer matching comprises:
    determining a distance between a template edge point of a template image and a query edge point of the 2D image:
    comparing the distance to a threshold value; and
    ignoring the query edge point in response to a determination that the distance exceeds the threshold value.

11. The method claim 1, further comprising generating the 3D translation value and the 3D rotation value for the object from the 2D representation data associated with the object, wherein the 3D translation value is derived from an x coordinate of a Cartesian coordinate system, a y coordinate of the Cartesian coordinate system, and a 2D angle, and wherein the 3D rotational value is derived from the 2D angle.

12. The method of claim 1, wherein the segmenting further generates third 3D surface point cloud data.

13. The method claim 1, wherein the predefined resolution depends on a size of the object.

14. The method claim 1, further comprising:
    selecting a 3D object template;
    performing an iterative closest point (ICP) operation using the second 3D surface point cloud data and the 3D object template; and
    outputting refined 3D pose data based on the ICP operation.

15. An apparatus comprising:
    a memory configured to store instructions; and
    a processor coupled to the memory and configured to execute the instructions to cause the processor to:
       perform a three-dimensional (3D) to two-dimensional (2D) projection operation on first 3D surface point cloud data associated with an object using a normal of a planar surface within the first 3D surface point cloud data by transforming the first 3D surface point cloud data into X-Y plane point cloud data and converting the X-Y plane point cloud data to a 2D image according to a predefined resolution to generate 2D representation data associated with the object;
       perform chamfer matching with respect to the 2D image to obtain match result data including a 3D translation value and a 3D rotation value for the object;
       generate 3D pose data for the object from at least a portion of the 2D representation data based on the 3D translation value and the 3D rotation value from the match result data and;
       segment the first 3D surface point cloud data, based on the 3D pose data, to generate at least second 3D surface point cloud data;
       generate output data based, at least in part, on the 3D pose data and the at least second 3D surface point cloud data; and
       recognize the object based on the output data.

16. The apparatus of claim 15, wherein the first 3D surface point cloud data comprises planar surface data.

17. The apparatus of claim 15, further comprising an interface configured to receive point cloud data.

18. The apparatus of claim 17, wherein the processor is further configured to execute the instructions to cause the processor to generate control data based on the output data.

19. The apparatus of claim 18, wherein the processor is further configured to execute the instructions to cause the processor to send the control data to a control device, wherein the control device is configured to cause a robotic arm, coupled to the control device, to manipulate the object.

20. The apparatus of claim 15, wherein the processor configured to execute the instructions to cause the processor to recognize the object data based on the output data further comprises the processor configured to execute instructions to cause the processor to further recognize an orientation of the object based on the output data.

21. The apparatus of claim 15, wherein the output data indicates an object type of the object, a position of the object, an orientation of the object, or a combination thereof.

22. A non-transitory computer readable medium comprising instructions that, when executed by a processor, cause the processor to:
    generate two-dimensional (2D) representation data associated with an object based on first three dimensional (3D) surface point cloud data associated with the object using a normal of a planar surface within the first 3D surface point cloud data by transforming the first 3D surface point cloud data into X-Y plane point cloud data and converting the X-Y plane point cloud data to a 2D image according to a predefined resolution;
    perform chamfer matching with respect to the 2D image to obtain match result data including a 3D translation value and a 3D rotation value for the object;
    generate 3D pose data for the object from at least a portion of the 2D representation data based on the 3D translation value and the 3D rotation value from the match result data and;
    segment the first 3D surface point cloud data, based on the 3D pose data, to generate at least second 3D surface point cloud data;
    generate output data based, at least in part, on the 3D pose data and the at least second 3D surface point cloud data; and
    recognize the object based on the output data.

23. The non-transitory computer readable medium of claim 22, wherein the instructions, when executed by the processor, further cause the processor to:
  receive 3D point cloud data; and
  further segment the first 3D surface point cloud data, based on the 3D pose data, to generate third 3D surface point cloud data.

24. The non-transitory computer readable medium of claim 22, wherein the instructions, when executed by the processor, further cause the processor to select a 2D object template, wherein the instructions that cause the processor to perform chamfer matching comprise perform the chamfer matching by matching the 2D object template and the 2D image to obtain the match result data.

25. The non-transitory computer readable medium of claim 22, wherein the instructions, when executed by the processor, further cause the processor to:
  generate control data based on the output data; and
  send the control data to a control device.

26. The non-transitory computer readable medium of claim 22, wherein the at least second 3D surface point cloud data comprises a subset of the first 3D surface point cloud data.

27. The non-transitory computer readable medium of, claim 22, wherein the output data includes an orientation of the object.

* * * * *